United States Patent [19]

Gamble

[11] 4,295,068
[45] Oct. 13, 1981

[54] CANTILEVERED FIELD WINDING SUPPORT FOR A SUPERCONDUCTING AC MACHINE

[75] Inventor: Bruce B. Gamble, Clifton Park, N.Y.

[73] Assignee: General Electric Company, Schenectady, N.Y.

[21] Appl. No.: 40,172

[22] Filed: May 18, 1979

[51] Int. Cl.³ .............................................. H02K 9/00
[52] U.S. Cl. ...................................... 310/52; 310/91; 310/261
[58] Field of Search .................... 310/10, 40, 91, 52, 310/54, 64, 261, 58, 59; 336/DIG. 1

[56] References Cited

U.S. PATENT DOCUMENTS

| | | | |
|---|---|---|---|
| 3,816,780 | 6/1974 | Smith | 310/52 |
| 3,904,901 | 9/1975 | Renard | 310/54 |
| 4,039,870 | 8/1977 | Sterrett | 310/52 |
| 4,060,742 | 11/1977 | Litz | 310/52 |
| 4,060,743 | 11/1977 | Weghaupt | 310/52 |
| 4,076,988 | 2/1978 | Litz | 310/52 |
| 4,082,967 | 4/1978 | Laskaris | 310/64 |
| 4,091,298 | 12/1978 | Gamble | 310/52 |
| 4,117,357 | 9/1978 | Baumann | 310/52 |
| 4,171,494 | 10/1979 | Yamaguchi | 310/261 |

Primary Examiner—R. Skudy
Attorney, Agent, or Firm—Nathan D. Herkamp; James C. Davis, Jr.; Paul R. Webb, II

[57] ABSTRACT

A dynamoelectric machine has a rotor including a driven shaft at one end thereof, an undriven shaft at the other end and a central section connecting said shafts. A superconducting field winding is disposed within said central section with a torque tube located concentrically with the rotor shafts. The torque tube and superconducting field winding are supported in cantilever fashion to one end of the rotor shafts.

12 Claims, 1 Drawing Figure

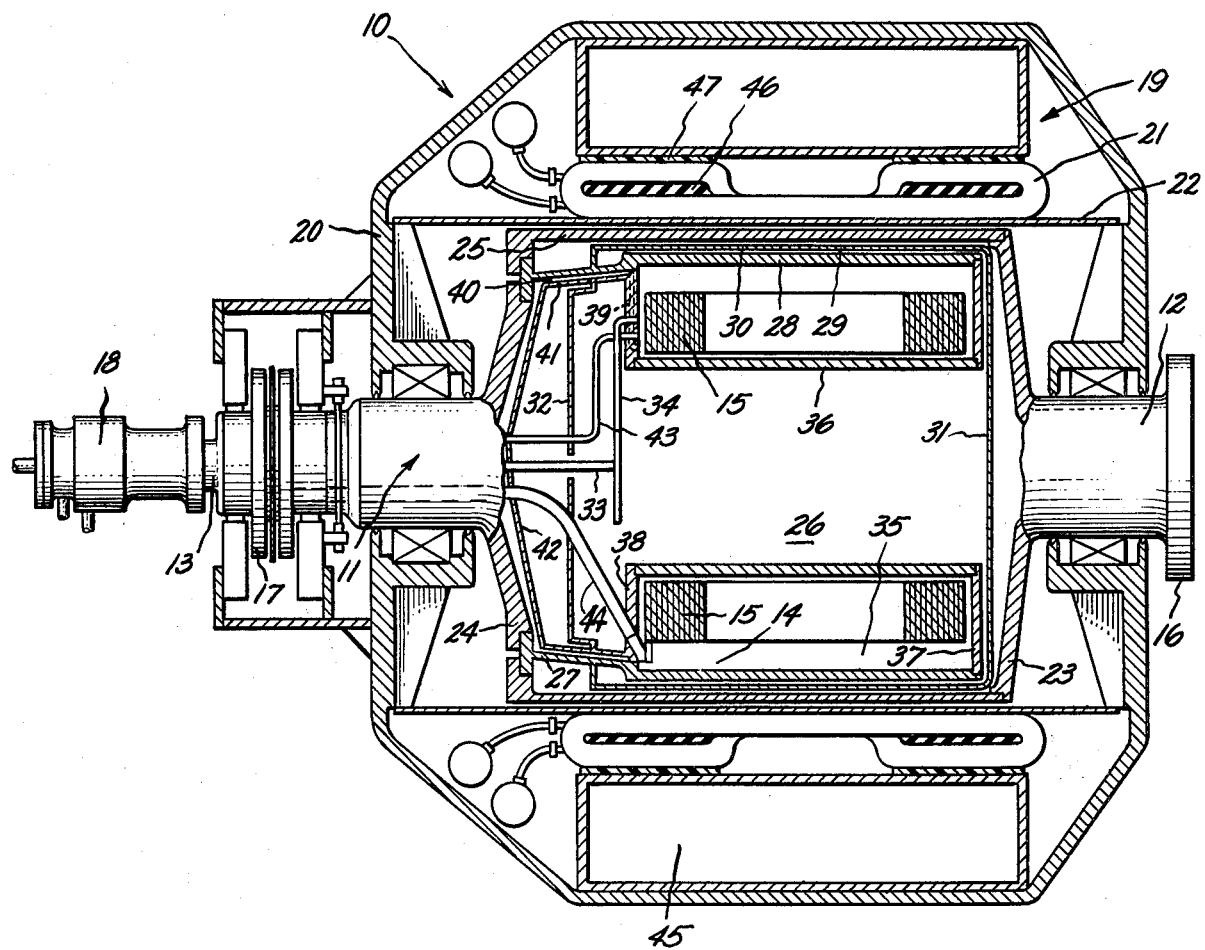

CANTILEVERED FIELD WINDING SUPPORT FOR A SUPERCONDUCTING AC MACHINE

BACKGROUND OF THE INVENTION

This invention relates to dynamoelectric machines employing superconducting field windings, and more particularly to a support system for mounting the rotor torque tube and superconducting winding within the rotor in cantilever fashion from the one end of the rotor shaft.

In a generator having a field winding, the superconducting field winding is supported within a torque tube located concentrically with the rotor shafts. The superconducting winding is connected to a source of electric current and a source of coolant through means located within the hollow rotor shaft. In prior art dynamoelectric machine designs employing superconducting field windings, the torque tube is mounted to the rotor shaft by torque tube extensions at each end thereof. The mounting of each end requires that some means be supplied to accommodate thermal contraction due to the cooling of the rotor field winding to cryogenic temperatures, usually by liquid helium, to a temperature of about 4° Kelvin. Further, the torque tube extensions form thermal conduction paths which must be cooled in order to limit the amount of heat added to the coolant, which can cause transition of the coolant, usually helium, from the liquid state to the gaseous state. Such a mounting structure for a superconducting rotor torque tube is illustrated in U.S. Pat. No. 4,082,967, issued Apr. 4, 1978 to Laskaris, and assigned to the instant assignee. Thermal distance extensions are attached to each end of the torque tube and separately cooled.

A mounting structure is shown in U.S. Pat. No. 4,117,357, issued Sept. 26, 1978 to Baumann, which incorporates a flexible coupling 48 at the driven end 6 of the rotor to mount the torque tube within the rotor shaft. As described in Baumann, each of the ends of the torque tubes exhibit a temperature gradient along their axial lengths which rises from the temperature of liquid helium, approximately 4° Kelvin, at the superconducting winding to room temperature at the flanges 23 and 24. Each end of the torque tube must be mounted and cooled to accommodate axial thermal expansion and contraction and also to accommodate the mechanical stresses experienced by the rotor elements during a short circuit.

A cryogenic current lead construction is described and illustrated in my prior U.S. Pat. No. 4,091,298, issued May 23, 1978 and assigned to the instant assignee, which incorporates the use of vaporized coolant to cool the current leads and the torque tube extension used to attach the torque tube at the end of the rotor shaft.

A support structure for the cryogenic temperature portion of a rotor shaft is described in U.S. Pat. No. 4,060,742, issued Nov. 29, 1977 to Litz. The mounting structure uses a torque tube extension 19 at one end of the cryogenic portion, and a plurality of spokes at the opposite end of the cryogenic portion to mount the cryogenic portion of the rotor within the torque tube. Litz describes a balancing between the stiffness of the support spokes and heat loss as the controlling design criteria for his structure.

To accommodate thermal expansion and contraction, the support for the cryogenic field winding and the torque tube must be so designed that unacceptable stress will not be applied to the torque tube or superconducting winding or the rotor shaft during either transition from room temperature to cryogenic temperature or from cryogenic temperature to room temperature. Further, the support structure must be able to withstand the angular deflection imposed upon the torque tube support during short circuit faults in the system. The support structure must also be designed to minimize the heat leak to the cryogenic temperature region in order to minimize the quantity of liquid helium vaporized during operation of the machine. Furthermore, the support structure should be such that the machine rotor can be easily assembled and tested.

Accordingly, it is an object of my invention to provide a torque tube and field winding support structure which will accommodate axial thermal expansion and contraction, and provide the required stiffness to resist angular deflection at fault current condition.

Another object of the instant invention is to provide the necessary support for the rotor torque tube and field winding while presenting a minimum of conduction paths for heat leak to the cryogenic section of the rotor and without requiring a complicated mechanical structure.

SUMMARY OF THE INVENTION

Briefly, the instant invention provides means for supporting the torque tube and superconducting winding of a superconducting electrodynamic machine in cantilever fashion from one end of the rotor.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

The single FIGURE is a schematic cross-sectional view of the interior portion of a superconducting electrical machine showing a support structure for the torque tube and superconducting winding according to the instant invention.

MANNER AND PROCESS OF MAKING AND USING THE INVENTION

In the FIGURE, an AC machine 10 includes a rotor 11 having a driven end shaft 12, a nondriven end shaft 13 and a central portion 14 surrounding a pluality, e.g., four, of circumferentially uniformly spaced field windings 15. The driven end shaft 12 includes a drive flange 16 adapted to be connected to a prime mover (not shown). Nondriven end shaft 13 contains means such as slip rings 17 to connect field windings 15 to a source of excitation current (not shown) via current leads 44, and a helium transfer coupling 18 to provide connection to a source of liquid helium (not shown). The liquid helium is provided to the interior of the central portion 14 of the rotor 11, and helium gas from the rotor central portion 14 is returned through the transfer coupling 18, either to be exhausted or to be reliquefied.

Surrounding the rotor is a stator 19 including environmental shield 20 and an armature winding 21 assembled around a stator bore tube 22. The stator may be cooled by a coolant fluid, such as water, supplied to coolant tank 45, or, alternatively, the windings 21 may comprise individually cooled, hollow conductors and appropriate coolant supply means. Insulation layer 46 may be incorporated at the armature end turns, and insulation layer 47 may be located between armature windings 21 and tank 45.

Central portion 14 includes two generally-conical members, 23 and 24, respectively, joined by a cylindrical electromagnetic shield 25 made of conductive materials such as aluminum. Electromagnetic shield 25 is provided to exclude nonsynchronous fields generated by the armature winding and external sources from the inner members of the central portion 14 of rotor 11. The space 26 inside the electromagnetic shield 25 and the end members 23 and 24 is evacuated to eliminate convection of heat from outside shield 25 into the interior of the rotor.

Attached to end member 24 at the undriven end of rotor 11 is torque tube extension 27 affixed to torque tube 28 and thermal radiation shield 29. Thermal radiation shield 29 includes a cylindrical portion 30 and end wall 31. The radiation shields 30 and 31 along with radiation shield 32 at the end of the central portion 14 of rotor 11 adjacent end member 24 reduce the amount of heat which enters the interior of the central portion 14 of the rotor 11.

Liquid helium is supplied via central supply tube 33 and radial supply tube 34 to an annular region 35 located between the torque tube 28 and a bore tube 36 and closed at the axial ends by members 37 and 38, within which field windings 15 are disposed. The annular region 35 includes support material for windings 15, which includes slots and channels in which the liquid helium is contained and circulated for maintaining the winding temperature low enough to maintain superconductivity.

The liquid helium absorbs heat from the field winding 15, heat conducted via the torque tube extension 27, and heat which is radiated from the thermal radiation shields 29 and 32, causing a portion of the helium to be vaporized. During normal operation, helium vapor is vented from the region 35 via radial holes 39 in end plate 38. These radial holes 39 provide a flow of helium vapor to annular space 40 between the torque tube extension 27 and the member 41. This flow of vapor cools torque tube extension 27 to limit the heat conducted to the cold central portion 14 of the rotor. This stream of helium in the gaseous state flows between conical members 24 and 42 and leaves the rotor through the helium transfer coupling 18.

Although the above description and the FIGURE shows the mounting torque tube extension to be at the undriven end of the rotor, the windings and torque tube could be mounted by a torque tube extension in cantilever fashion from the driven end of the rotor with appropriate cooling and electrical connections to the helium transfer coupling 18 and the slip rings 17. In such a construction no direct mechanical connection would exist between end member 24 and torque tube 28.

During transient increases in helium vapor flow, caused by shorting of the armature or other rapid armature current changes which increase heat input to and consequently vaporization of coolant, helium vapor is exhausted from the volume 35 via exhaust tube 43 which is in flow communication with the helium transfer coupling 18. The helium vapor is then taken from the machine either to be vented or to apparatus in which the helium vapor will be reliquefied and returned to the supply system for delivering liquid helium to the rotor.

In the construction described above, torque tube extension 27 provides ambient to cryogenic temperature support for the low temperature region comprised of bore tube 36, region 35, field windings 15, and torque tube 28 of the rotor. The single torque tube extension which contacts both the low temperature region of the rotor and the ambient temperature portion of the rotor requires only a single cooling flow of vapor over the support means to limit conduction of heat into the cryogenic portion of the rotor. No mechanical connection is provided between conical member 23 and the cryogenic central portion 14 of the rotor. Thereby, the vacuum space 26 surrounding thermal radiation shield 29 is not interrupted on the driven end of the rotor, and conduction of heat into the region of the field winding at the driven end of the rotor is thereby completely precluded.

During a fault in the load connected to armature winding 21, large torsional forces appear on the electromagnetic shield 25 and are transmitted to the drive shaft. Electromagnetic shield 25 is torsionally deflected, and since in most designs it is mechanically connected on both ends to the torque tube through torque tube extensions, the torque tube extensions, and thereby the torque tube, receive torsional loading. In the instant invention, this torsional loading of the torque tube during a fault is decreased, since no reaction force to the torsional deflection of electromagnetic shield 25 upon torque tube extension 27 at the driven end of the machine is transmitted through torque tube 28 to the torque tube extension 27 at the nondriven end of the machine.

When the machine is assembled, the central cryogenic portion of the rotor is installed within the rotor as a single unit attached by the torque tube extension 27 to the rotor shaft. Thereby, when the field winding is cooled to cryogenic temperature, the relative contraction between the central portion of the rotor 14 and the remainder of the rotor is accommodated readily by relative movement between the parts cooled to cryogenic temperature and the rest of the rotor, since a single torque tube extension 27 connects the two. The central cryogenic portion is installed within the rotor as a complete assembly. This includes a helium plumbing subassembly comprised of conical member 42, cylindrical member 41, end plate 38, thermal radiation shield 32, field winding current leads 40, and tubing 33, 34 and 43. This subassembly can be leak tested at room temperature and cryogenic temperature prior to assembly into the rotor. This facilitates testing of the cryogenic portion of the rotor for vacuum leaks without having to completely assemble the machine, install necessary test equipment, test the machine, and then disassemble the machine completely in order to correct any vacuum leaks which are discovered by testing. With my invention testing and correction for heat leaks may be done outside the machine, which greatly simplifies construction and assembly of the superconducting machine.

Torque tube extension 27 is cooled by helium vapor being transmitted from volume 35 through space 40 axially toward helium transfer coupling 18. A spiral wall may be added to member 41 to cause helium vapor to flow in a spiral around member 41. Thereby, the coldest vapor is exposed to that portion of torque tube extension 27 which is adjacent the cryogenic portion, and the warmer vapor is exposed to the ambient temperature end of the torque tube extension. Thereby, a temperature gradient between ambient and cryogenic temperature portionsof torque tube extension 27 is readily maintained along its axial length. Helium transfer coupling 18 is connected to a vent or return collector for the helium vapor.

In a particular example a generator is designed according to the above-described invention to provide 20 megawatts of DC power from a rectifier at a voltage of from 20 to 40 KV DC (kilovolts) at a nominal operating speed of 6,000 RPM. The field winding comprises four racetrack-shaped epoxy-impregnated modules manufactured with multifilamentary superconductor in a cabled configuration, disposed between the bore tube and the torque tube and supported by a torque tube extension in cantilevered fashion from the undriven end of the machine. The armature winding comprises a high current density, water cooled, winding. The rotor field winding has an outer radius of 10.5 inches, a thickness of 0.75 inches and an axial length of 21.0 inches. The selected operating current density is 15,000 amps per square centimeter on the overall cross-sectional area of the winding. A pool of approximately 4.5 liters of liquid helium is contained in the winding region, which at operating speed is held to the outer portion of vlume 35 by centrifugal force, thereby, creating a liquid-vapor interface within the volume 35. Vapor to cool the torque tube and support structure is collected from volume 35 and passed over torque tube extension 27.

A design consideration of the instant invention is the ratio of axial length of the rotor torque tube to its diameter, due to the mechanical vibration requirements of a centilever support. So long as the length-to-diameter ratio is in the range of about 1:1 to 5:1 and preferably 1:1 to 2:1, the natural frequency of vibration of the cantilevered assembly is well above the design rotational frequency for most applications. This frequency of vibration is inversely proportional to the square of the length-to-diameter ratio. Maintaining the length-to-diameter ratio within the stated range also limits the effect upon balance of the rotor of slight unbalance of the cryogenic portion of the rotor assembly and of assymmetrical cooling of the torque tube extension due to slightly nonuniform warming of the vapor flowing out over torque tube extension 27 from the region 35 around the field winding. Rotor vibration is more sensitive to these factors as the ratio increases.

BEST MODE

The best mode I contemplate for my invention incorporates a liquid helium coolant and an apparatus as shown with a rotor torque tube length-to-diameter ratio of 1:1. The torque tube extension includes a spiral wall to direct helium vapor flow in a spiral as it passes axially along the torque tube extension, and the torque tube extension is attached to the rotor at the undriven end of the rotor.

The foregoing describes a structure for supporting the cryogenic portion of a superconducting rotor in cantilever fashion within the rotor shaft. The support described provides a simple construction capable of complete assembly and testing outside the rotor prior to assembly within the rotor which readily accommodates axial contraction at cool-down to the liquid helium temperature and accommodates angular deflection produced by generator faults without adding additional sources of heat leak at the driven end of the rotor.

I claim:

1. In a superconducting electrical machine including a rotor comprising a shaft adapted to be driven in rotation about a longitudinal axis of the rotor, a hollow undriven shaft disposed concentrically with said driven shaft and a hollow axially central portion disposed concentrically with and attached to each of said shafts, and a torque tube and at least one superconducting winding disposed within said hollow central portion; a support means for said torque tube and said field winding comprising:
    means for supporting said torque tube and said superconducting winding within said central portion and substantially concentrically with said rotor shafts in cantilever fashion from one of said shafts.

2. The apparatus of claim 1 further comprising a coolant supply means for supplying a liquid coolant from the undriven end of said rotor to the interior of said torque tube, and means for exhausting coolant vapor from said interior of said torque tube through said undriven end of said rotor.

3. The apparatus of claim 2 further comprising a thermal radiation shield surrounding said torque tube and supported in cantilever fashion by said support means.

4. The apparatus of claim 3 wherein said means for supporting said torque tube and said superconducting winding comprises a torque tube extension which extends from one axial end of said torque tube adjacent said undriven shaft to a generally conically-shaped end member of said central portion of said rotor connected to said undriven shaft.

5. The apparatus of claim 4 wherein said central portion further comprises another generally conically-shaped end member and an electromagnetic shield of conducting material connecting said end members and surrounding said torque tube and said thermal radiation shield.

6. The apparatus of claim 5 wherein said coolant comprises liquid helium.

7. The apparatus of claim 4 wherein said torque tube has a length-to-diameter ratio in the range of 1:1 to 5:1.

8. The apparatus of claim 7 wherein said length-to-diameter ratio is in the range of 1:1 to 2:1.

9. The apparatus of claim 2 further comprising a bore tube concentrically disposed within said torque tube and connected thereto by end walls, said torque tube, said bore tube and said end walls being disposed to define an annular volume around said axis and four circumferentially uniformly spaced superconducting windings disposed within said volume, and said liquid coolant supply means includes at least one supply tube connected to said volume to supply a coolant liquid thereto for cooling said superconducting winding.

10. The apparatus of claim 9 wherein said coolant comprises liquid helium.

11. The apparatus of claim 9 further comprising current lead means for supplying electrical excitation current to said superconducting windings, said lead means extending through said undriven shaft to the interior of said torque tube and being in electrical contact with said field windings.

12. The apparatus of claim 9 wherein said means for supporting said torque tube and said at least one superconducting winding comprises a generally cylindrical torque tube extension attached to said torque tube at one axial end thereof and attached to a conical end member of said central portion at the other axial end thereof, said torque tube extension being cooled by vapor boiled off from a coolant contained within said torque tube for cooling said field winding.

* * * * *